United States Patent
Sivaramu et al.

(10) Patent No.: US 12,323,490 B2
(45) Date of Patent: Jun. 3, 2025

(54) FRAGMENTED TRANSFER OF DATA OVER NETWORKS

(71) Applicant: Advanced Micro Devices, Inc., Santa Clara, CA (US)

(72) Inventors: Raghava Sivaramu, Santa Clara, CA (US); Vipin Jain, Santa Clara, CA (US); Rajshekhar Biradar, Bangalore (IN)

(73) Assignee: Advanced Micro Devices, Inc., Santa Clara, CA (US)

( * ) Notice: Subject to any disclaimer, the term of this patent is extended or adjusted under 35 U.S.C. 154(b) by 8 days.

(21) Appl. No.: 18/381,991

(22) Filed: Oct. 19, 2023

(65) Prior Publication Data

US 2025/0133133 A1  Apr. 24, 2025

(51) Int. Cl.
*H04L 67/1097* (2022.01)
(52) U.S. Cl.
CPC .................. *H04L 67/1097* (2013.01)
(58) Field of Classification Search
CPC .................................................. H04L 67/1097
See application file for complete search history.

(56) References Cited

U.S. PATENT DOCUMENTS

| | | | |
|---|---|---|---|
| 10,630,610 B1* | 4/2020 | Wang | H04L 49/9057 |
| 2021/0297509 A1* | 9/2021 | Thubert | H04W 72/1221 |
| 2022/0006734 A1* | 1/2022 | Wang | H04L 41/0895 |
| 2022/0303231 A1* | 9/2022 | Yu | H04L 45/64 |

* cited by examiner

*Primary Examiner* — Farzana B Huq
(74) *Attorney, Agent, or Firm* — Patterson + Sheridan, LLP

(57) ABSTRACT

Embodiments herein describe creating multiple packet fragments from a large data chunk that, for example, exceeds a maximum transmission unit (MTU) supported by a network. In one embodiment, a network interface controller or card (NIC) receives a direct memory access (DMA) from a connected host to transmit an IP packet or data using remote direct memory access (RDMA) technologies. The NIC can evaluate the data chunk associated with the DMA request and determine whether it exceeds the MTU for the network. Assuming it does, the NIC determines how many fragments to divide the data chunk into, and can fragment any portion of the data at flexible packet/payload offsets. The NIC can then retrieve the data chunk from host memory fragment-by-fragment, rather than reading the data chunk all at once, generating headers for the fragments, and then transmit them as packet fragments.

17 Claims, 6 Drawing Sheets

FRAGMENTED TRANSFER OF DATA OVER NETWORKS

TECHNICAL FIELD

Examples of the present disclosure generally relate to fragmenting data chunks that are too large to be transmitted on a network.

BACKGROUND

IP fragmentation is a process used in the Internet Protocol IP) to transmit data packets that are larger than the maximum transmission unit (MTU) supported by a network. When a packet is too large to be transmitted across a network in a single piece, IP fragmentation divides the packet into smaller fragments that can be transmitted and reassembled at the destination.

One benefit of IP fragmentation includes allowing communication between networks with different MTU sizes. Networks may have diverse infrastructures, and some networks might have smaller MTU sizes due to various constraints. By fragmenting packets, data can still be transmitted across these networks without requiring network-wide MTU adjustments.

Another benefit of IP fragmentation includes data transfer flexibility enabling the transmission of large packets, such as file transfers or multimedia streams, without the need for packet segmentation on the application layer. This allows applications to send larger chunks of data in a single IP packet, simplifying the data transfer process and potentially reducing the overhead of handling multiple smaller packets.

However, current IP fragmentation techniques may copy (replicate) packets multiple times to generate IP fragments which can increase latency and increase memory demands.

SUMMARY

One embodiment described herein is a network interface controller or card (NIC) that includes circuitry configured to receive a request from a host to transmit a data chunk using a network, wherein the data chunk exceeds a maximum transmission unit (MTU) size of the network and retrieve information for generating headers for a plurality of packet fragments. The NIC also includes an egress pipeline comprising circuitry configured to generate the headers using the information retrieved by the circuitry and transmit the plurality of packet fragments on the network, wherein the plurality of packet fragments each comprises a respective one of the headers and a different portion of the data chunk.

One embodiment described herein is an integrated circuit (IC) that includes circuitry configured to receive a request from a host to transmit a data chunk using a network where the data chunk exceeds a maximum transmission unit (MTU) size of the network and retrieve information for generating headers for a plurality of packet fragments. The IC also includes an egress pipeline comprising circuitry configured to generate the headers using the information retrieved by the circuitry and transmit the plurality of packet fragments on the network, wherein the plurality of packet fragments each comprises a respective one of the headers and a different portion of the data chunk.

One embodiment described herein is a method that includes receiving, at a NIC, a request from a host to transmit a data chunk using a network; retrieving information for generating headers for a plurality of packet fragments; generating, at the NIC, the headers using the information; and transmitting, from the NIC, the plurality of packet fragments on the network, where the plurality of packet fragments each includes a respective one of the headers and a different portion of the data chunk.

BRIEF DESCRIPTION OF DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
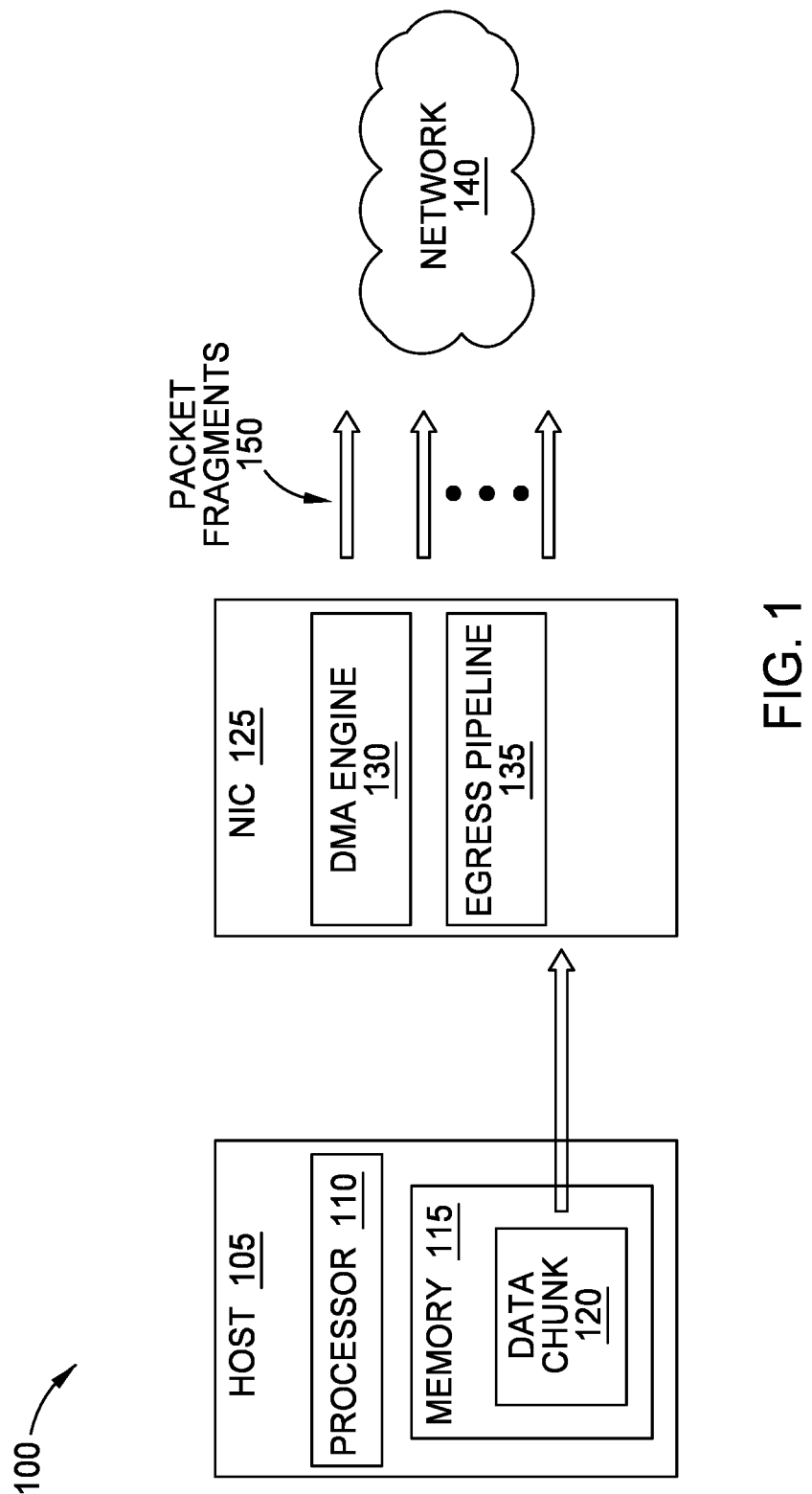
FIG. 1 illustrates a block diagram of a system that performs data fragmentation, according to an example.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the embodiments herein or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Embodiments herein describe creating multiple packet fragments from a large data chunk that, for example, exceeds a MTU supported by a network. In one embodiment, a network interface controller or card (NIC) receives a direct memory access (DMA) request from a connected host to transmit a data chunk using remote direct memory access (RDMA) technologies. The NIC can evaluate the data chunk associated with the DMA request and determine whether it exceeds the MTU for the network, Assuming it does, the NIC determines how many fragments to divide the data chunk into. The NIC can then retrieve the data chunk from host memory portion-by-portion (or a group of subportions), rather than reading the data chunk all at once.

The NIC can also retrieve metadata for creating headers for the data fragments. This metadata can include an IP header (if the data chunk is an IP packet) or information for generating packet headers (if the data chunk is not an IP packet). The NIC can then generate headers for each data fragment and transmit the packet fragments on the network. Advantageously, the embodiments herein can avoid having to replicate the data chunk multiple times in the NIC. In one embodiment, each fragment is read and stored in the NIC only once before it is formed into a packet and transmitted on the network. Another non-limiting advantage of the embodiments herein is they can enable fragmenting any portion of the data at flexible packet/payload offsets and programmatically add layers of headers on each fragment, thereby allowing for higher layers than the typical layer 3 IP fragmentation for custom use-cases of transport/session layer fragmentation. Moreover, the embodiments herein can advantageously reduce the number of pipeline passes used to generate the fragments in the NIC, and is scalable due to its low-latency characteristics.

FIG. 1 illustrates a block diagram of a system 100 that performs data fragmentation, according to an example. The system 100 includes a host 105, a NIC 125, and a network 140. The host 105 can be any computing device (e.g., a server). For example, the host 105 may be a computing device in a data center or a cloud computing environment. The host 105 includes a processor 110 which represents any number of processors which can each include any number of processor cores. The host 105 also includes memory 115 which can be volatile memory, non-volatile memory, and combinations thereof.

In this example, the memory 115 stores a data chunk 120. In one embodiment, the data chunk 120 may be an Internet Protocol (IP) packet that the host 105 wishes to transmit on the network 140 (e.g., an IP network such as the Internet), In other embodiments, the data chunk 120 may not be an IP packet, but could be data that the host 105 wants to transmit to another computing device via the network 140. For example, the system 100 can use RDMA or RDMA over Converged Ethernet (RoCE) to transmit the data chunk 120. For instance, the data chunk 120 may be generated by a graphics processing unit (GPU) in the host 105 that should be processed by a GPU in another host. The host 105 can use RoCE to transmit the data chunk 120 as a packet in the network 140 to the destination computing device.

The NIC 125 can be communicatively coupled to the host 105 using, e.g., a Peripheral Component Interconnect Express (PCIe) connection. In one embodiment, the NIC 125 may be in the same form factor as the host 105—e.g., coupled to a motherboard in the host 105—but this is not a requirement.

The NIC 125 includes a DMA engine 130 which has circuitry configured to perform DMA to retrieve the data chunk from the host 105. The DMA engine 130 can determine whether the data chunk 120 exceeds the MTU of the network 140. If so the DMA engine 130 can determine how to divide the data chunk into fragments where each of the fragments is at or below the MTU. These fragments can be the payloads of packet fragments 150 which are then transmitted on the network 140. For example, if the data chunk is 10,000 bytes and the MTU of the network 140 is 2,000 bytes, the DMA engine 130 may decide to divide the data chunk into five 2,000 byte payloads where each payload is packetized into one of the packet fragments 150.

In addition, the DMA engine 130 can retrieve metadata for creating the headers for packet fragments 150. If the data chunk 120 is an IP packet, the DMA engine 130 can read the IP header from the memory 115. However, if the data chunk 120 is not an IP packet, the DMA engine 130 can use a connection or socket corresponding to the destination of the data chunk 120 to retrieve metadata for creating the headers for the packet fragments 150.

The NIC 125 includes an egress pipeline 135 which has circuitry that generates the headers for the packet fragments 150. In one embodiment, the egress pipeline 135 receives the metadata from the DMA engine 130, and uses this metadata to generate the headers. This is discussed in more detail below. In one embodiment, the NIC 125 is implemented using one or more integrated circuits (ICs) or chips.

Figure 2:
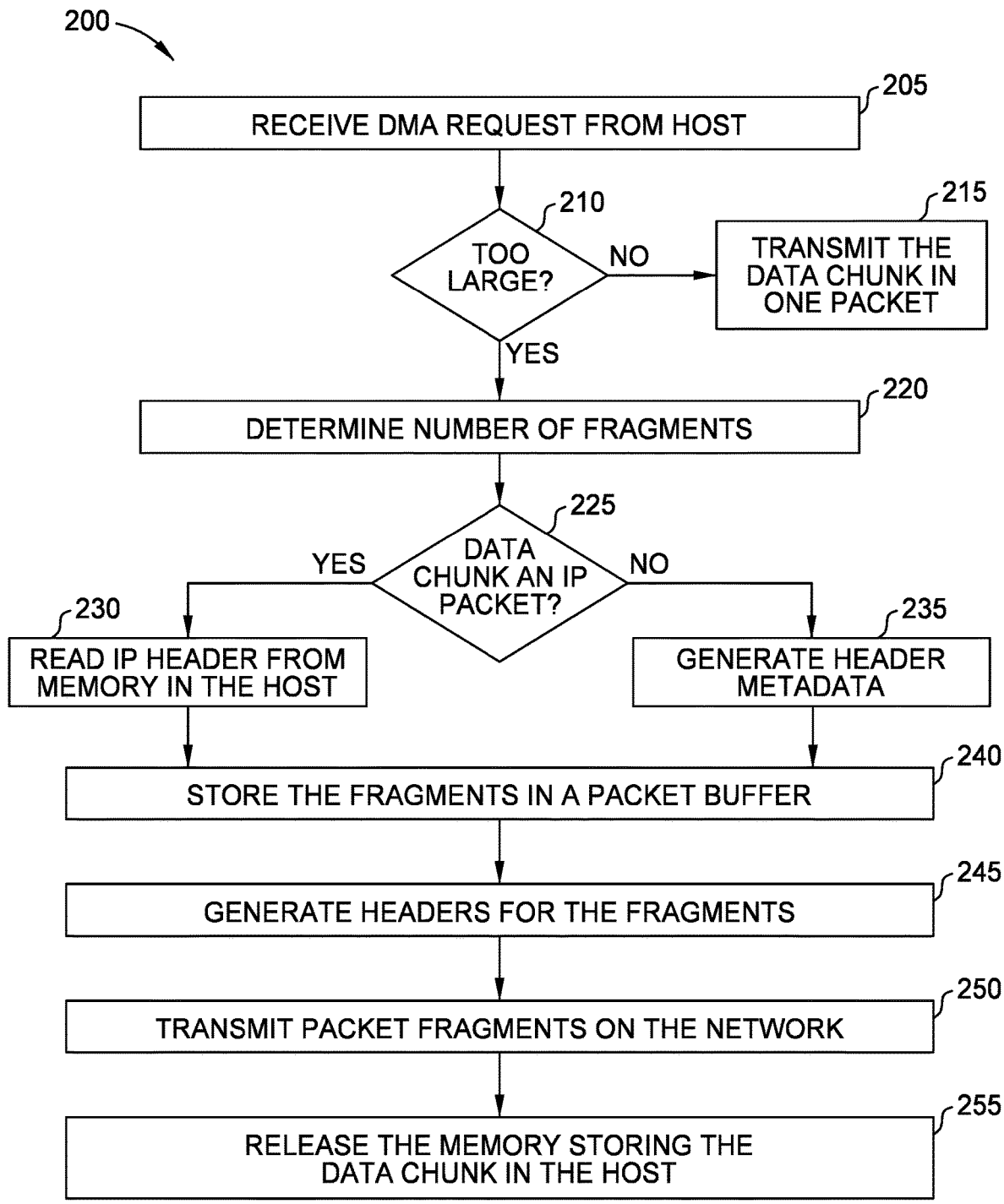
FIG. 2 is a flowchart for performing data fragmentation, according to an example.

FIG. 2 is a flowchart of a method 200 for performing data fragmentation, according to an example, At block 205, the NIC receives a DMA request from a host. In one embodiment, the NIC includes a DMA engine (e.g., the DMA engine 130 in FIG. 1). In one embodiment, the DMA engine is programmable.

The DMA request can specify a data chunk (e.g., the data chunk 120 in FIG. 1) that the host wants the NIC to transmit on the network. The data chunk can be an IP packet, or might be data that has not already been packetized. For example, the data chunk could be data generated by a processor (e.g., a GPU) that is not capable of generating packets.

In one embodiment, the data chunk is defined by scatter-gather lists (SGLs) that the host provides to the NIC. The DMA engine can evaluate the entries in the SGLs to determine the size of the data chunk, or the DMA request may indicate the size of data chunk. For example, the data chunk may be spread across different memories (or memory addresses) in the host. However, at this point in the method 200, the DMA engine may not retrieve the data chunk from the host memory.

At block 210, the DMA engine determines whether the data chunk in the DMA request is too large for the network—e.g., exceeds the MTU.

If not, the method 200 proceeds to block 215 where the NIC transmits the data chunk in one packet. That is, if the data chunk is an IP packet, the NIC can retrieve the IP packet from host memory and forward it. If the data chunk in not an IP packet, the NIC can retrieve the data from host memory, create a header, and then add the data chunk as a payload of the packet.

If the data chunk is too large, the method 200 proceeds to block 220 where the DMA engine determines the number of fragments to divide the data chunk into. For example, if the MTU is 2,000 bytes, and the data chunk is 3,000 bytes, the DMA engine may divide the data chunk into one 1,000 byte payload and one 2,000 byte payload, or two 1,500 byte payloads.

At block 225, the NIC determines whether the data chunk is an IP packet. If so, the method 200 proceeds to block 230 where the DMA engine reads the IP header from memory in the host. That is, the IP header for the packet may be part of the data chunk that is stored in the host memory. While at this block the DMA engine reads the header from the data chunk, it might not read the rest of the IP packet (e.g., the payload) from host memory.

If the data chunk is not an IP packet, the method 200 proceeds to block 235 where the DMA engine generates header metadata. To do so, the DMA engine may identify a destination of the data chunk. For a connection-orientated protocol (e.g., RoCE), the DMA engine can retrieve data corresponding to the destination which can be used as metadata to generate a header. This information can be retrieved by knowing the destination or socket information of the data chunk.

At block 240, the NIC stores the fragments in a packet buffer, That NIC may be able to process multiple fragments of the data chunk in parallel. In that case, the DMA engine can read the data corresponding to those fragments from the host memory using, e.g., the SGLs. In any case, only a portion of the data chunk may be stored in the packet buffer at any given time. For example, the DMA engine may first retrieve one or more fragments of data from the data chunk in host memory, packetize the data into packet fragment as described below, and then retrieve one or more additional fragments of data from the data chunk in host memory. This process can repeat until the DMA engine has retrieved all the data in the data chunk.

At block 245, the egress pipeline in the NIC generates headers for the fragments. These headers can be generated using the IP header retrieved at block 230 (if the data chunk is an IP packet) or the metadata generated at block 235 (if the data chunk is not an IP packet).

At block 250, the NIC transmits packet fragments on the network. Each packet fragment includes a fragment (or payload) of the data chunk stored in the packet buffer and a header generated at block 245.

At block 255, the NIC releases the memory storing the data chunk in the host. In one embodiment, the NIC releases the memory once all the packet fragments for the data chunk have been sent. In another embodiment, because the packet fragments may be sent at different times, the NIC releases the portion of the data chunk that is in the packet fragments as they are sent.

Figure 3:
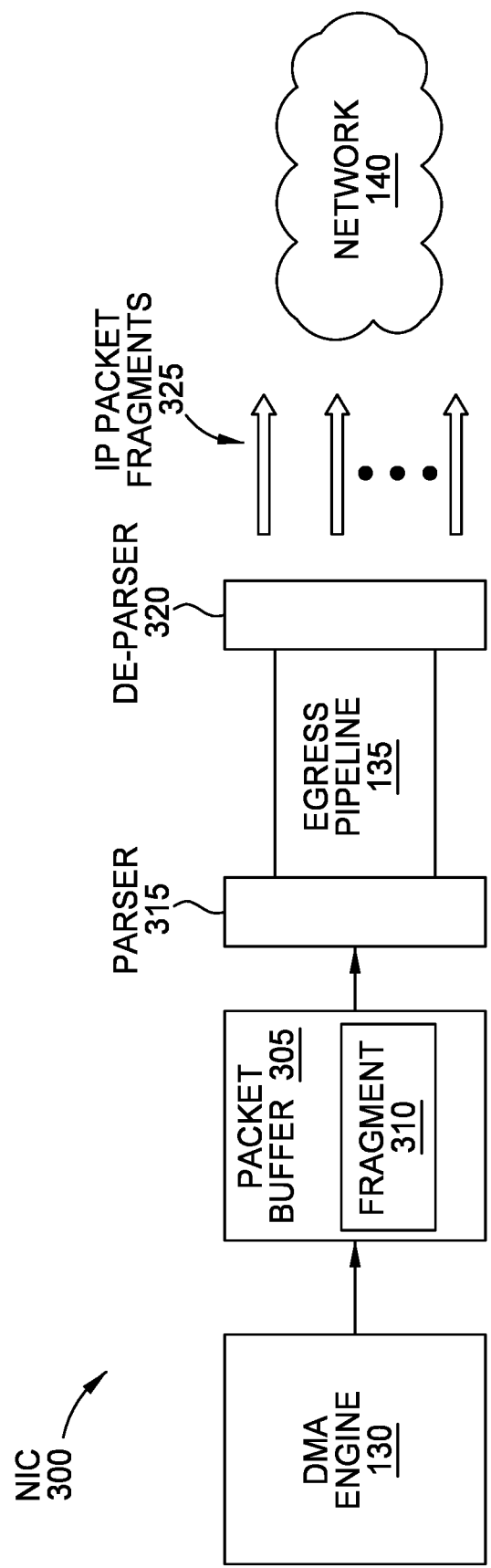
FIG. 3 illustrates a block diagram of a network interface card or controller (NIC) that performs IP fragmentation, according to an example.

FIG. 3 illustrates a block diagram of a NIC 300 that performs IP fragmentation, according to an example. That is, FIG. 3 illustrates a configuration of a NIC 300 for fragmenting IP packets that a host wants to send on a network which exceed the MTU.

The NIC 300 includes the DMA engine 130 which retrieves the IP header from the IP packet stored in the host memory as described at block 230. The DMA engine 130 may also determine that the IP packet exceeds the MTU and determine how many packet fragments should be created in order to transmit the IP fragment.

A packet buffer 305 stores one or more fragments 310 of the IP packet. The fragments 310 correspond to the payload of the IP packet fragments 325. The NIC 300 may be able to process multiple fragments at a time, and thus, may store multiple fragments in the packet buffer 305. However, the overall size of the packet buffer 305 may be smaller than the total size of the IP packet (or the non-IP packet data chunk), which means the NIC 300 uses multiple iterations to generate the IP packet fragments 325 for transmitting the entire payload of the IP packet generated by the host.

While FIG. 3 illustrates using a packet buffer 305 to store the fragments 310 this is not a requirement. In other embodiments, the data from the host can be directly retrieved from the source memory using DMA to generate the packets 325 without storing the data in a packet buffer 305.

The NIC 300 includes a parser 315 for processing the header of the IP packet. The egress pipeline 135 then uses the information in the header (which was generated by the host) to generate IP headers for the IP packet fragments 325. The embodiments herein are not limited to any particular type of algorithm or technique for generating the headers for the packet fragments 325. As a non-limiting example, the packets can be processed as described in Request for Comment (RFC) 791 so the fragments can be reassembled at their destination. The headers for the packet fragments 325 may be different than the header in the large packet generated by the host. For example, the headers for the packet fragments 325 may be updated to include information so that the network destination can reassemble the payloads in the packet fragments 325 to create the original data payload in the original IP packet created by the host.

The NIC 300 includes a de-parser 320 for preparing the IP packet fragments 325 for transmission on the network 140. In one embodiment, the parser 315, the egress pipeline 135, and the de-parser 320 are part of (or compatible with) the P4 Portable NIC Architecture (PNA). However, the embodiments herein are not limited to the P4 PNA and can be executed using any hardware that can perform the functions described herein. P4 is a domain-specific language for describing how packets are processed by a network data plane. A P4 program comprises an architecture, which describes the structure and capabilities of the pipeline, and a user program, which specifies the functionality of the programmable blocks within that pipeline.

Advantageously, the fragments are only copied from host memory once. Also, the fragments are not replicated or copied in the NIC 300 when generating the packet fragments 325.

Figure 4:
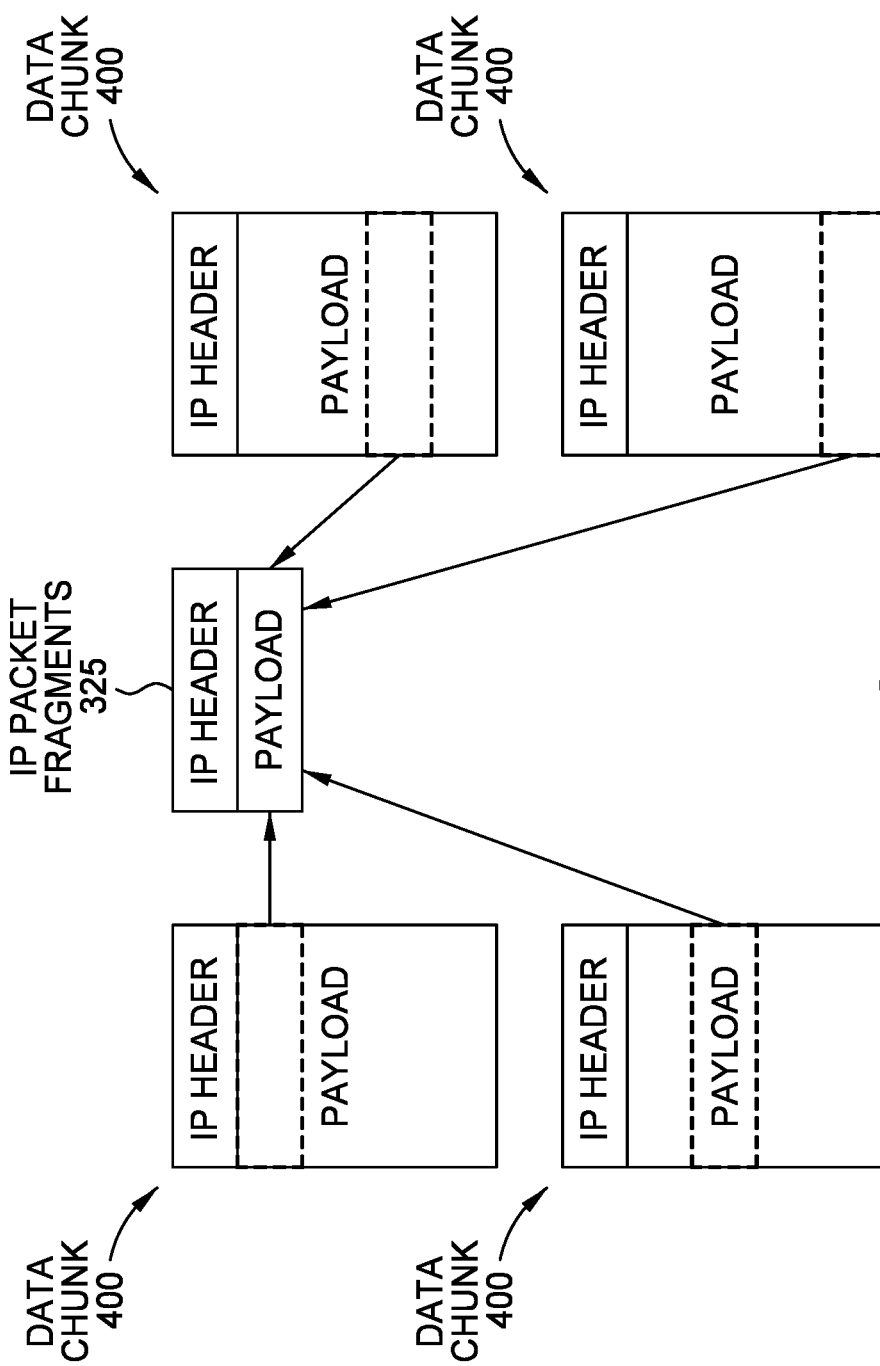
FIG. 4 illustrates performing IP fragmentation, according to an example.

FIG. 4 illustrates performing IP fragmentation, according to an example. FIG. 4 illustrates a data chunk 400 that is an IP packet that includes an IP header and a payload. The data chunk 400 is repeated four times in FIG. 4, but this is just for illustration purpose since the embodiments herein avoid having to copy or replicate the IP packet in the NIC. Instead, the dotted lines illustrate that the NIC can pull different portions of the payload of the packet from host memory to generate the smaller IP packet fragments 325. In this example, the NIC retrieves four payload fragments from the host memory which are then placed in four IP packet fragments 325. Put differently, the four IP packet fragments 325 contain four payload fragments where their union equals the payload of the IP packet that is the data chunk 400.

Figure 5:
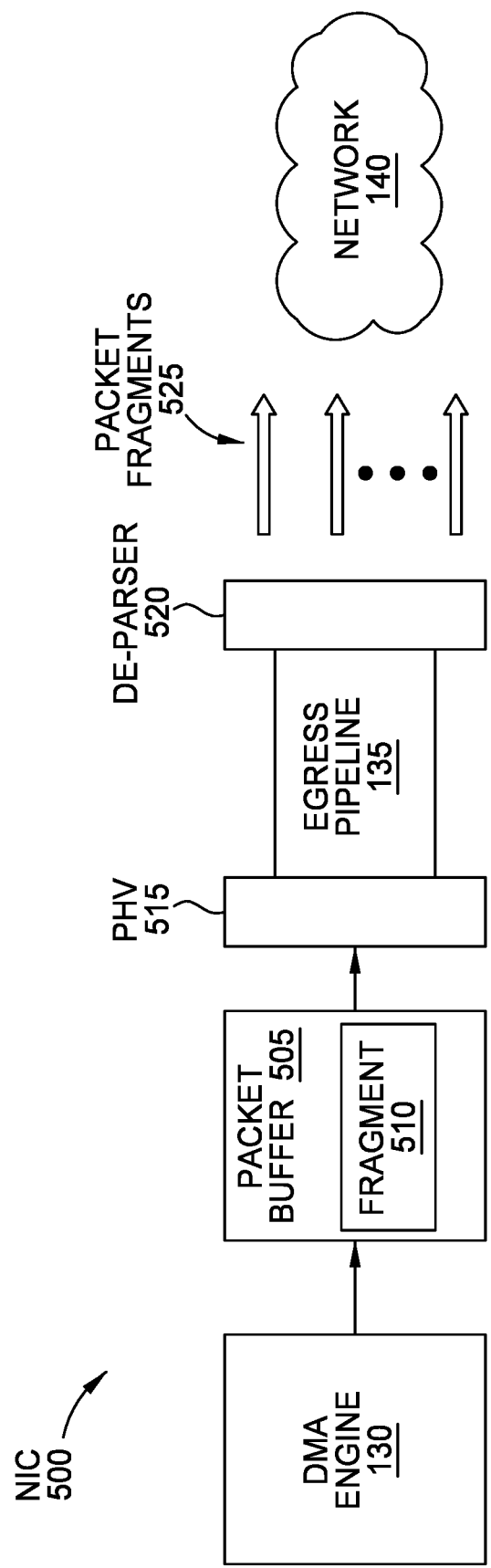
FIG. 5 illustrates a block diagram of a NIC that performs direct memory access (DMA) fragmentation, according to an example.

FIG. 5 illustrates a block diagram of a NIC 500 that performs DMA fragmentation, according to an example. Unlike in FIGS. 3 and 4 which describe IP fragmentation, in FIG. 5 (and FIG. 6) the data chunk being fragmented is not an IP packet.

The NIC 500 includes the DMA engine 130 which generates (or retrieves) metadata for generating headers for the packet fragments 525. Here, the data chunk being fragmented does not have an IP header. As discussed in block 235 of FIG. 2, the DMA engine can generate the metadata for creating headers for the packet fragments 525 using information about the destination of the data chunk, which can include socket information, session information, and the like.

After determining how many fragments to create from the data chunk, the DMA engine 130 stores one or more of the fragments in the packet buffer 505. The NIC 500 may be able to process multiple fragments at a time, and thus, may store multiple fragments 510 in the packet buffer 505. However, the overall size of the packet buffer 505 may be smaller than the total size of the data chunk, which means the NIC 500 uses multiple iterations to generate the packet fragments 525 for transmitting the entire data chunk.

While FIG. 5 illustrates using the packet buffer 505 to store the fragments 510 this is not a requirement. In other embodiments, the data from the host can be directly retrieved from the source memory using DMA to generate the packets 525 without storing the data in a packet buffer 505.

The NIC 500 includes a packet header vector (PHV) for processing the metadata received from the DMA engine 130 and the fragments 510 stored in the packet buffer 505.

The egress pipeline 135 uses the metadata to generate a header for each of the packet fragments 525. Each of the packet fragments 525 includes one of the fragments 510 and a header generated by the egress pipeline 135.

The headers of the packet fragments 525 contain information used to route the packets through the network 140. The packet fragments 525 may be IP headers, but are not limited to such. In one embodiments, the packet fragments 525 include headers that match whatever protocol is used by the network 140.

The NIC 500 also includes a de-parser 520 for preparing the packet fragments 525 for transmission on the network 140. In one embodiment, the PHV 515, the egress pipeline 135, and the de-parser 520 are part of (or compatible with) the P4 PNA. However, the embodiments herein are not limited to the P4 PNA and can be executed using any hardware that can perform the functions described herein.

Figure 6:
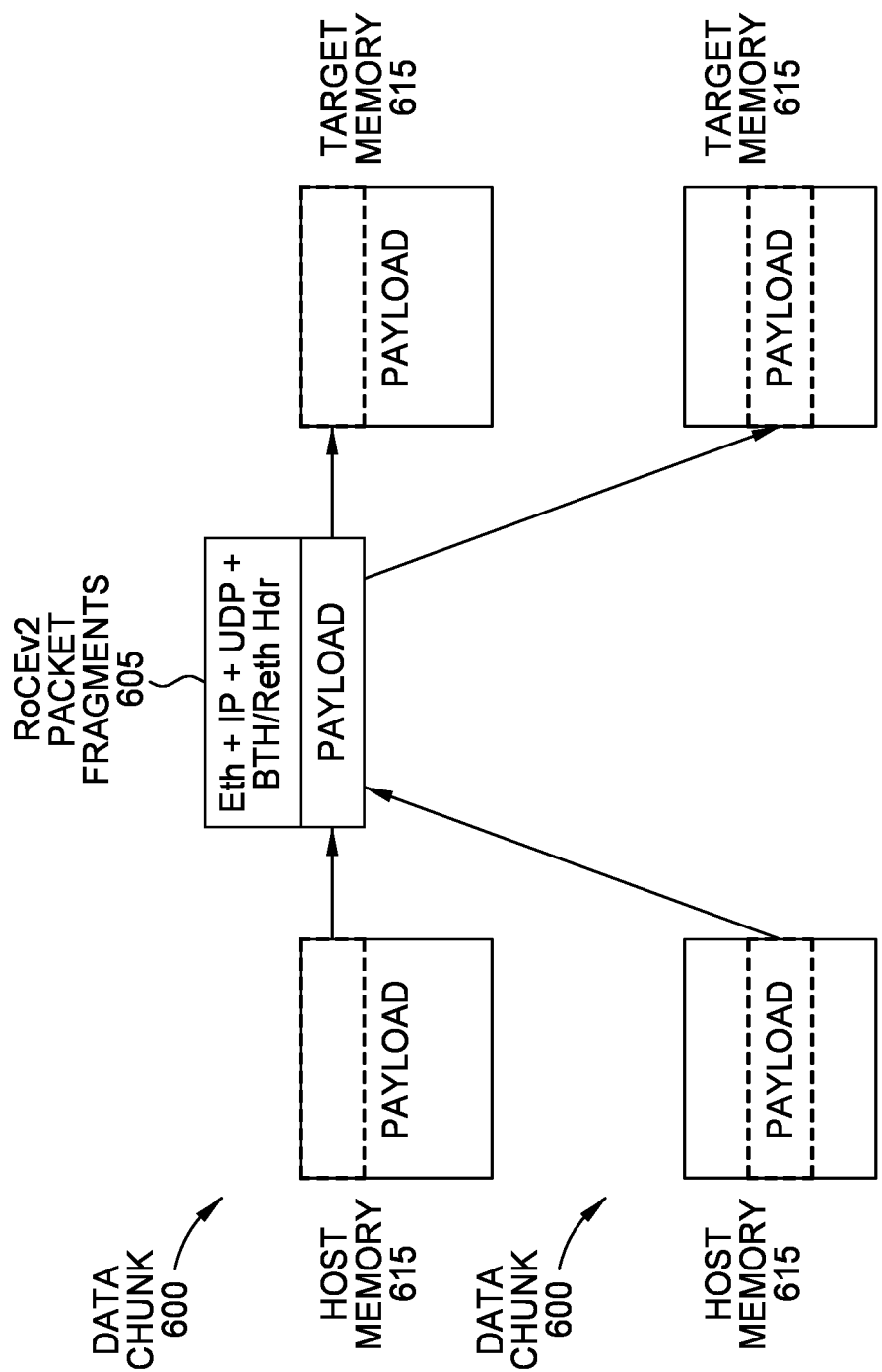
FIG. 6 illustrates performing remote DMA (RDMA) fragmentation, according to an example.

FIG. 6 illustrates performing DMA fragmentation, according to an example. FIG. 6 illustrates a data chunk 600 that is not an IP packet. The data chunk 600 is repeated two times in FIG. 6, but this is just for illustration purpose since the embodiments herein avoid having to copy or replicate the IP packet in the NIC. Instead, the dotted lines illustrate that the NIC can pull different portions of the data chunk 600 from host memory 115 to generate the payload for packet fragments 605. The headers for the packet fragments 605 are generated by the egress pipeline as discussed above.

In this example, the packet fragments are RoCEv2 packet fragments 605. The headers for the fragments 605 can include Ethernet information, IP addresses, User Datagram Protocol (UDP) information, and Base Transport Headers (BTH), RDMA extended transport header (RETH) information, and the like.

FIG. 6 also illustrates storing the payload of the packet fragments 605 into target memory 615. That is, the payload in the fragments 605 can be reassembled in the receiver (target) and stored in the target memory 615. In this manner, the data chunk 600 can be moved from the host memory 115 to the target memory 615.

Advantageously, the embodiments herein can perform IP/data fragmentation using only hardware elements (e.g., without involving software or a general purpose processor). That is, the hardware in the NIC can create packet fragments that collectively contain the entire data chunk and satisfy the MTU size of the network.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system or method. Accordingly, aspects may take the form of an entirely hardware embodiment that may all generally be referred to herein as a "circuit," "module" or "system."

Aspects of the present disclosure are described below with reference to flowchart illustrations and/or block diagrams of methods, and apparatus (systems) according to embodiments presented in this disclosure. It will be understood that each block of the flowchart illustrations and/or block diagrams, and combinations of blocks in the flowchart illustrations and/or block diagrams, can be implemented by one circuit or multiple circuits.

The flowchart and block diagrams in the Figures illustrate the architecture, functionality, and operation of possible implementations of systems and methods according to various examples of the present invention. In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts.

While the foregoing is directed to specific examples, other and further examples may be devised without departing from the basic scope thereof, and the scope thereof is determined by the claims that follow.

What is claimed is:

1. A network interface controller or card (NIC), comprising:
   circuitry configured to:
      receive a direct memory access (DMA) request from a host to transmit a data chunk using a network, wherein a DMA engine in the NIC determines the data chunk exceeds a maximum transmission unit (MTU) size of the network and stores different portions of the data chunk in a packet buffer in the NIC using multiple iterations, and
      retrieve information for generating headers for a plurality of packet fragments; and
   an egress pipeline comprising circuitry configured to:
      generate the headers using the information retrieved by the circuitry, and
   transmit the plurality of packet fragments on the network, wherein the plurality of packet fragments each comprises a respective one of the headers and a different portion of the data chunk.

2. The NIC of claim 1, wherein the data chunk is an internet protocol (IP) packet generated by the host, and the network is an IP network.

3. The NIC of claim 2, wherein retrieving the information comprises:
   reading an IP header from a portion of host memory that stores the data chunk.

4. The NIC of claim 1, wherein the data chunk is not an IP packet.

5. The NIC of claim 4, wherein retrieving the information comprises:
   generating metadata based on a destination of the data chunk in the network.

6. The NIC of claim 1, wherein the different portions of the data chunk are not replicated when stored in the NIC.

7. An integrated circuit (IC), comprising:
   circuitry configured to:
      receive a direct memory access (DMA) request from a host to transmit a data chunk using a network, wherein a DMA engine in the IC determines the data chunk exceeds a maximum transmission unit (MTU) size of the network and stores different portions of the data chunk in a packet buffer in the IC using multiple iterations, and retrieve information for generating headers for a plurality of packet fragments; and an egress pipeline comprising circuitry configured to:
  generate the headers using the information retrieved by the circuitry, and
  transmit the plurality of packet fragments on the network, wherein the plurality of packet fragments each comprises a respective one of the headers and a different portion of the data chunk.

8. The IC of claim 7, wherein the data chunk is an internet protocol (IP) packet generated by the host, and the network is an IP network.

9. The IC of claim 8, wherein retrieving the information comprises:
  reading an IP header from a portion of host memory that stores the data chunk.

10. The IC of claim 7, wherein the data chunk is not an IP packet, wherein retrieving the information comprises:
  generating metadata based on a destination of the data chunk in the network.

11. The IC of claim 10, wherein retrieving the information comprises:
  generating metadata based on a destination of the data chunk in the network.

12. The IC of claim 7, wherein the different portions of the data chunk are not replicated when stored in the IC.

13. A method, comprising:
  receiving, at a NIC, a DMA request from a host to transmit a data chunk using a network;
  determining, at a DMA engine in the NIC, that the data chunk exceeds a MTU size of the network;
  storing, at the DMA engine, different portions of the data chunk in a packet buffer in the NIC using multiple iterations;
  retrieving information for generating headers for a plurality of packet fragments;
  generating, at the NIC, the headers using the information; and
  transmitting, from the NIC, the plurality of packet fragments on the network, wherein the plurality of packet fragments each comprises a respective one of the headers and a different portion of the data chunk.

14. The method of claim 13, wherein the data chunk is an internet protocol (IP) packet generated by the host, and the network is an IP network.

15. The method of claim 14, wherein retrieving the information comprises:
  reading an IP header from a portion of host memory that stores the data chunk.

16. The method of claim 13, wherein the data chunk is not an IP packet, wherein retrieving the information comprises:
  generating metadata based on a destination of the data chunk in the network.

17. The method of claim 13, wherein the different portions of the data chunk are not replicated when stored in the NIC.

* * * * *